United States Patent [19]

Zinn

[11] E Re. 29,412

[45] Reissued Sept. 27, 1977

[54] STUDS

[76] Inventor: Daniel L. Zinn, 2545 Beaufait, Detroit, Mich. 48207

[21] Appl. No.: 633,748

[22] Filed: Nov. 20, 1975

Related U.S. Patent Documents

Reissue of:

[64] Patent No.: 3,841,047
Issued: Oct. 15, 1974
Appl. No.: 382,606
Filed: July 25, 1973

U.S. Applications:

[62] Division of Ser. No. 257,943, May 30, 1972, abandoned, which is a division of Ser. No. 74,022, Sept. 21, 1970, abandoned.

[51] Int. Cl.[2] ..... E04C 3/07

[52] U.S. Cl. ..... 52/720; 52/346; 52/732

[58] Field of Search ..... 52/243, 346, 347, 356, 52/359, 730, 729, 100, 364, 738, 481, 714, 720, 732, 743, 747, 741, 243, 241, 242; 181/33 A, 33 G, 33 GA, 33 GC, 33 K

[56] References Cited

U.S. PATENT DOCUMENTS

| | | | |
|---|---|---|---|
| 1,909,930 | 5/1933 | De Ridder | 52/720 X |
| 1,963,416 | 6/1934 | Minshall | 52/720 |
| 2,968,070 | 1/1961 | Wolstead | 52/364 |
| 3,177,620 | 4/1965 | Brown et al. | 52/347 |
| 3,324,615 | 6/1967 | Zinn | 52/346 X |
| 3,333,390 | 8/1967 | Banning | 52/481 X |
| 3,370,391 | 2/1968 | Dupis et al. | 52/346 |
| 3,445,975 | 5/1969 | Nelsson | 52/346 |
| 3,525,189 | 8/1970 | Nelsson | 52/378 |
| 3,611,653 | 10/1971 | Zinn | 52/407 X |
| Re. 24,658 | 6/1959 | Hollister | 181/33 G |

*Primary Examiner*—Price C. Faw, Jr.
*Assistant Examiner*—Leslie Braun
*Attorney, Agent, or Firm*—Cullen, Settle, Sloman & Cantor

[57] ABSTRACT

For use in wall constructions, novel studs are here shown, characterized by their having two sides or flanges of different resiliency when formed and mounted.

They may be of different resiliency when initially formed; or they may be of similar resiliency when initially formed, but become of different resiliency when mounted.

7 Claims, 8 Drawing Figures

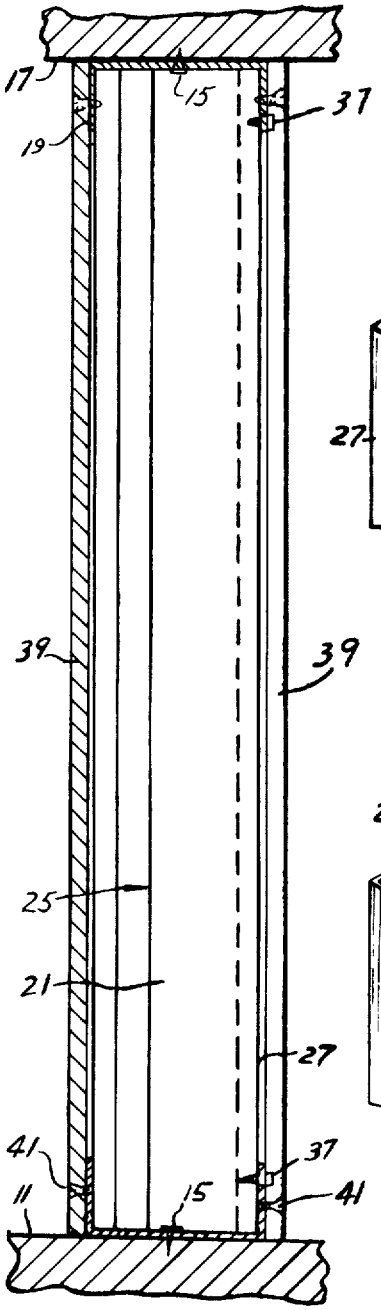
FIG. 3
FIG. 5
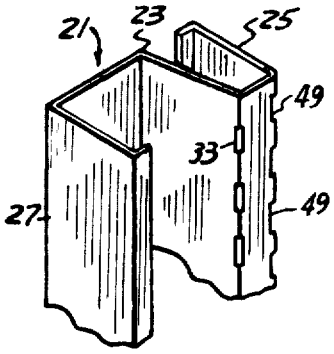
FIG. 6
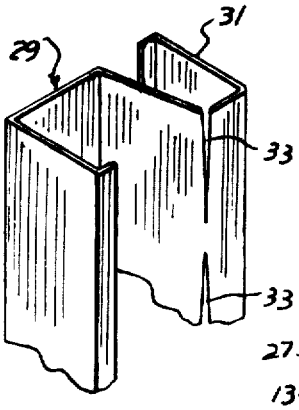
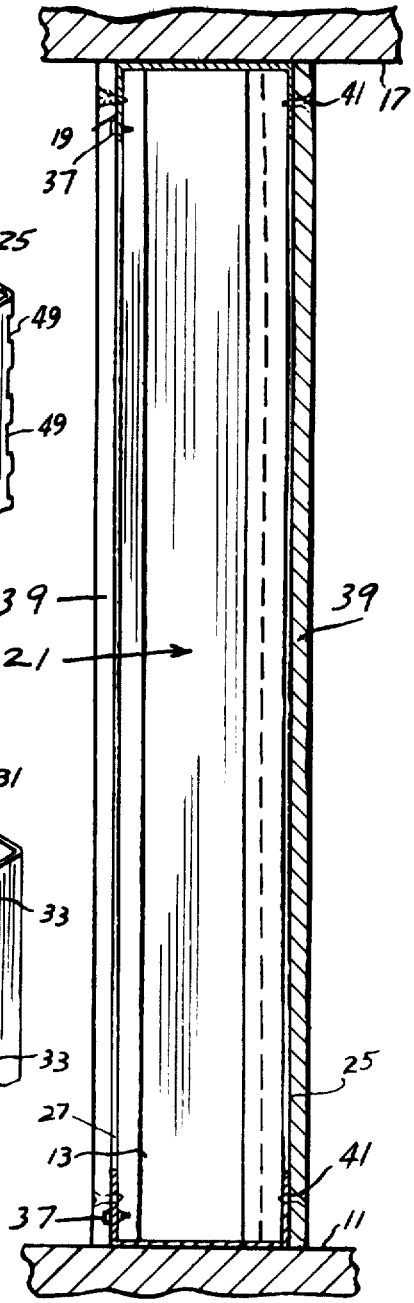
FIG. 4

STUDS

Matter enclosed in heavy brackets [ ] appears in the original patent but forms no part of this reissue specification; matter printed in italics indicates the additions made by reissue.

CROSS REFERENCES

This application is a division of my copending application, Ser. No. 257,943 of May 30, 1972 now abandoned, which was a division of and copending with application Ser. No. 74,022 of Sept. 21, 1970, now abandoned.

This application relates specifically to "Studs" used in the Wall Construction of my application Ser. No. 382,604, filed July 25, 1973, and in Methods of my application Ser. No. 382,605, filed July 25, 1973.

THE PREFERRED EMBODIMENTS

The preferred embodiments of such studs are shown in the appended drawings, to be read in conjunction with this specification.

THE DRAWINGS

FIG. 1 is a fragmentary perspective view of a portion of the present sound attenuation wall.

FIG. 3 is a fragmentary section taken in the direction of arrows 3—3 of FIG. 1.

FIG. 4 is a fragmentary section taken in the direction of arrows 4—4 of FIG. 1.

FIG. 5 is a fragmentary perspective view of the present improved stud construction.

FIG. 6 is a similar view of a modification.

DETAILED DESCRIPTION OF THE EMBODIMENTS SHOWN IN THE DRAWINGS

Figure 8:
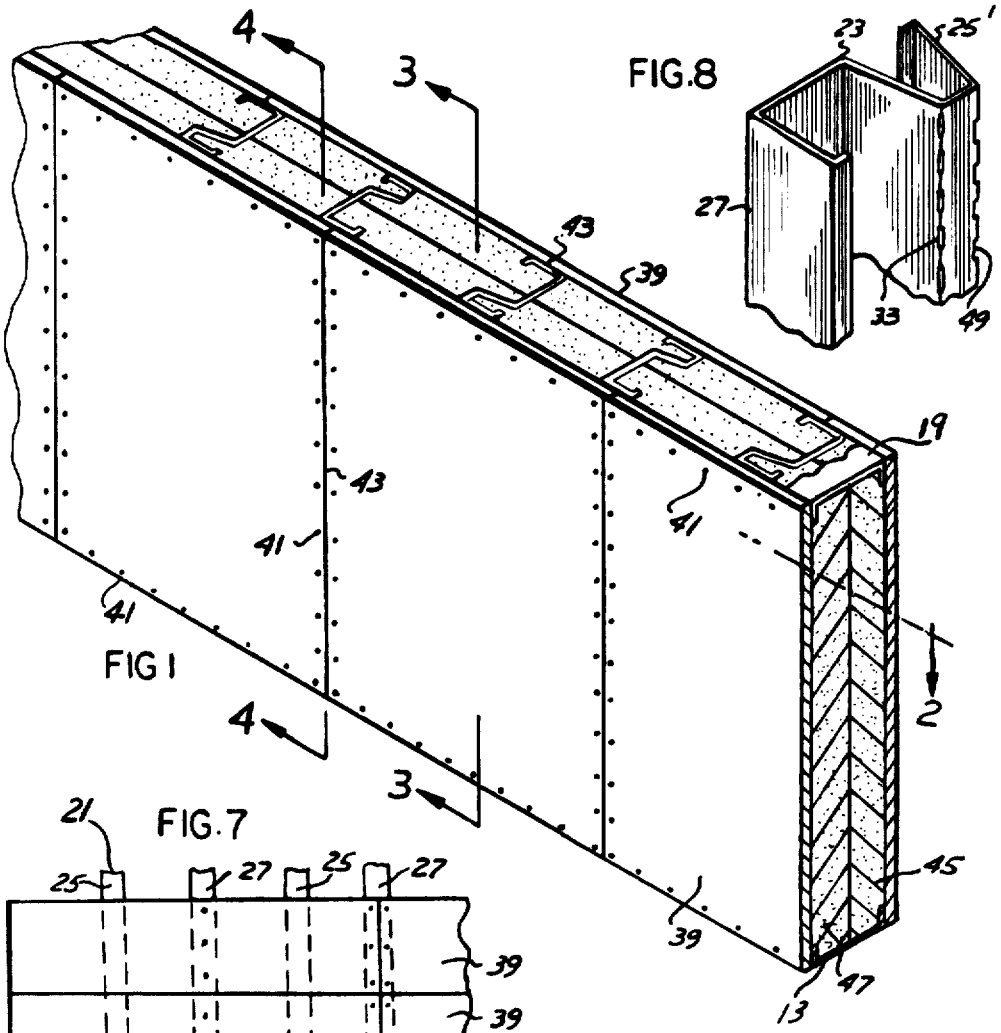
FIG. 8 is similar to FIG. 5 showing a modified stud.

A sound attenuation wall is shown in FIG. 1, and as indicated in FIGS. 3 and 4 is adapted for use between fixed structures, such as a building floor 11 and ceiling 17, having channels 13 and 19 secured by fasteners 15.

THE STUDS

A line or series of longitudinally spaced studs 21 having webs 23 is interposed between and projects into channels 13 and 19 and are suitably secured thereto with each stud, having a first side 25 and a second side 27, both of some resilience.

The studs 21 are alternately reversed so that the first and second flanges 25–27 of adjacent studs are alternately reversed.

The second flanges 27 are anchored to the channels by fasteners 37. The first flanges 25 are not anchored to the channels.

Thus, flanges 25 are more resilient than flanges 27 when the studs are mounted. Resiliency is the rebounding of the flange after removal of a deflecting force or load. To properly compare the resiliency of two flanges, it is of course understood that the loading or force on each must be the same in amount and in location relative to each web—flange juncture.

THE PANELS

Wallboard panels 39 are applied to opposite sides of the studs with the wallboards on each side being in alignment and in engagement with each other at their edges.

The wallboard panels on each side of the studs throughout the length of the partition are in engagement along the registry lines 43, FIG. 1 which correspond to the central portions of the particular second flanges 27 to which the wallboards are fixed by fasteners 41.

Each wallboard panel spans at least three studs with the outer edges of each panel fixed to the second flanges 27 of the outer of said three studs as by fasteners 41. In the modification shown in FIG. 7, the wallboards extend longitudinally and span more than three studs.

Figure 7:
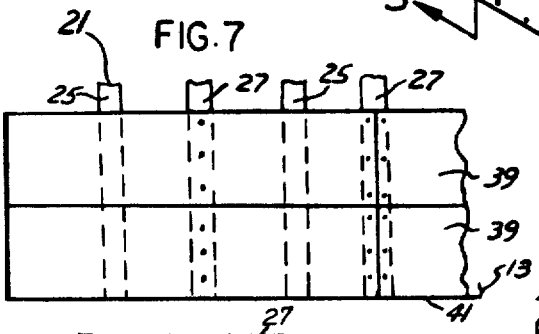
FIG. 7 is a fragmentary elevational view with the partitions extending longitudinally.

The central or inner portion of each panel 39 is adjacent a first stud flange 25. In FIG. 7, central portions of the panels loosely bear against adjacent resilient first flanges 25.

Figure 2:
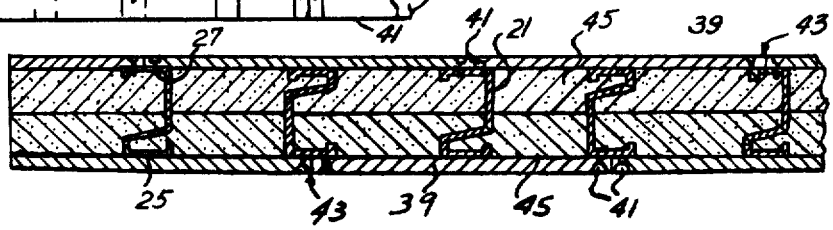
FIG. 2 is a fragmentary section taken in the direction of arrows 2—2 of FIG. 1.

It is noted particularly with respect to FIGS. 1 and 2 that the panels 39 upon opposite sides of the partition at their respective meeting edges 43 are staggered or offset. Thus, the meeting line 43 between a pair of panels on one side of the wall is in registry with a corresponding central or intermediate portion of an opposed panel. The panels upon opposite sides of the wall are staggered whereby the panels on one side of the wall each spans three adjacent studs and the opposing but staggered wallboard on the opposite side of the partition spans two of the said three studs.

By this construction the outer edges of each panel are fixed to the second flange 27 of the corresponding stud whereas the central portion of each panel yieldingly bears against the corresponding resilient first flange 25 of the intermediate stud.

Thus, the individual panels affixed at their edges yieldably bear against the respective central stud and are adapted to flex inwardly and outwardly in the functioning of the present sound attenuation panel.

The panels along their top and bottom edges are fixedly secured to the floor and ceiling channels by fasteners 41. Likewise in FIG. 7, the longitudinal edges of some panels bear against and are affixed to channels 13 or 19.

Suitable sound absorbing pads or blankets 45, of which a pair are shown, FIGS. 1 and 2, are interposed in compression between the assembled opposed wallboards 39 and have a very definite function in the final operation of the present sound attenuating panel. While the present panel as constructed is effective as a sound attenuation panel even without the sound absorbing pads interposed, an improved sound attenuation panel is provided when said pads are provided.

It has been found in operation that any inward flexing of the corresponding wallboards due to the transmission of sound vibrations therethrough causes a frictional rubbing action of the wallboard with respect to the sound absorbing pad. This rubbing action transforms sound energy to heat, thus, dissipating the sound and provides an improved sound attenuation wall partition. The compressed pads also dampen vibrations.

Glass fiber strips are shown in the illustrative embodiment, nine feet long for example, and thus extend between the floor and ceiling and are interposed in compression between the wallboards when assembled.

The resilient backing of each wallboard throughout its height is achieved by the yieldable first flanges 25 providing a yielding relationship between the wallboard and the supporting stud.

THE STUDS (CONTINUED)

As previously indicated, the broader aspect of this invention is that the studs, when formed and mounted, have first and second flanges of different resiliency. One method of accomplishing this result is to anchor only one flange of a stud to the channels. Thus, the stud as mounted provides the desired result.

Alternatively, the stud as formed but prior to mounting may have flanges of different resiliency, in which case anchoring only one flange to the channels is optional.

One such stud 29 is fragmentarily shown in FIG. 6. The first flange 31 is provided additional resiliency by a series of aligned spaced slits 33 formed in the stud web.

In FIG. 5 the first flange 25 is given additional resilience by the use of more slits. Longitudinally spaced slits 33 correspond to those of FIG. 6. Further longitudinally spaced slits 49 are formed at the one longitudinal edge of flange 25. Slits 49 are alternately arranged and staggered with respect to slits 33.

FIG. 8 is yet another modification of the stud in that the resilient first flange 25' is initially before assembly non-parallel to second flange 27. Flange 25' extends outwardly at an acute angle to flange 27 in the range of 5°-20° for illustration.

Upon assembly of the wallboards such as in FIGS. 1 and 2, the resilient first flanges 25' shown in FIG. 8 are then in compression and substantially parallel to plane flanges 25. Resilient first flange 25' has been rendered more flexible and resilient by two series of slits 33 and 49.

*My Prior Patent 3,611,653*

*This co-pending issued Patent 3,611,653, hereinafter referred to as the "tabbed stud patent" since it discloses a "tabbed stud" is referenced here so that it may be contrasted, on the record, with the instant patent hereinafter referred to as the "tabless stud patent" since it discloses a "tabless stud".*

*In the "tabbed stud" construction, the two flanges of a stud are anchored and of equal resilience, with one flange, however, having integral struck-out tabs 31. These tabs are intended to provide the bearing surface, which is thus made up of isolated, separated, small projections, bound to be a variety of heights, thus, providing an irregular bearing surface. Since some, at least, of the tabs 31 can and may and probably would become twisted and deformed between the point and time of manufacture and the point and time of use, such tabs could puncture and damage the formed wall surface and panels.*

*The tabless studs hereof will present no such problems, since they are shown in the drawings as free of tabs or protuberances.*

CONCLUSION

While presently preferred embodiments of the invention have here been disclosed, supra, the inventive concepts hereof are not limited to such preferred embodiments but are those defined in the claims which follow.

I claim:

1. An improved stud having a bearing flange, a mounting flange and a web joining the mounting flange to the bearing flange, said stud for use in a wall made up of a line of substantially identical studs and wall panels on opposite sides of the wall, with the studs alternated in reversed arrangement so that on each side of the wall the mounting flanges alternate with the bearing flanges; each pair of adjacent wall panels on each side of the wall having their adjacent panel edges fastened to a mounting flange and with each panel on each side of the wall having its central part bearing against a bearing flange; the improvement comprising:

*said bearing flange and said mounting flange being substantially parallel and aligned on opposite sides of said web, said web including first and second legs interconnected by a transverse member, said transverse member being non-parallel relative to said bearing flange and said mounting flange;* each bearing flange and each mounting flange and its juncture with the web being so formed that the entire bearing flange will deflect a greater amount, from the web-flange juncture to the free end of the flange, than the deflection of the mounting flange from its web-flange juncture to its free end under the same loading at the same distance from the respective web-flange junctures;

said mounting flange providing a stiffer, less resilient mounting for the adjacent edges of a pair of panels so that when the panels are fastened to a mounting flange the panels are retained firmly and snugly against the mounting flange in a manner to avoid deflection inwardly or outwardly from the plane of such panels;

said bearing flange providing a more resilient bearing for the center of a panel having its edges fastened to a pair of mounting flanges, so that the center of the panel and the bearing flange flex inwardly resiliently for sound attenuation, but with the center of the panel being free of outward bias from the bearing flange, which bearing flange is formed to be free of a tendency to deflect outwardly, though it is resilient enough to be flexed inwardly by outward sound waves impinging against the panel, *said bearing flange and said mounting flange each being substantially smooth and substantially free of internal and external protuberances between its edges; so that substantially the entire area of such bearing flange provides a resilient overall bearing area for the adjacent central part of a panel.*

2. The invention as defined in claim 1 wherein the juncture between the web and the mounting flange is formed to be more rigid than the juncture between the web and the bearing flange.

3. The invention as defined in claim 1 wherein the juncture between the web and the bearing flange has weakening formations which produce greater resiliency.

4. The invention as defined in claim 1 wherein the two flanges are in substantial transverse alignment relative to the web.

5. The invention as defined in claim 1 wherein the web has resilience producing weakening formations which are closer to the bearing flange juncture than to the mounting flange juncture.

6. The invention as defined in claim 1 wherein the web includes first and second legs interconnected by a transverse member, said second leg being longer than said first leg and being joined to said mounting flange.

7. The invention as defined in claim 1 wherein the two flanges are parallel.

* * * * *